United States Patent
Blaisdell et al.

(10) Patent No.: US 7,669,088 B2
(45) Date of Patent: *Feb. 23, 2010

(54) SYSTEM AND METHOD FOR MONITORING APPLICATION AVAILABILITY

(75) Inventors: Russell C. Blaisdell, Cedar Park, TX (US); John Michael Lake, Cary, NC (US); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/337,179

(22) Filed: Dec. 17, 2008

(65) Prior Publication Data

US 2009/0094488 A1 Apr. 9, 2009

Related U.S. Application Data

(63) Continuation of application No. 11/030,249, filed on Jan. 6, 2005, now Pat. No. 7,480,834.

(51) Int. Cl.
*G06F 11/00* (2006.01)
(52) U.S. Cl. ...................................................... 714/47
(58) Field of Classification Search .................. 714/47, 714/26, 57
See application file for complete search history.

(56) References Cited

U.S. PATENT DOCUMENTS

| | | | |
|---|---|---|---|
| 5,872,976 A | 2/1999 | Yee et al. | |
| 6,178,529 B1 | 1/2001 | Short et al. | |
| 6,434,714 B1 | 8/2002 | Lewis et al. | |
| 6,748,555 B1 | 6/2004 | Teegan et al. | |
| 6,981,182 B2 | 12/2005 | Roddy et al. | |
| 7,062,685 B1 | 6/2006 | Plofsky et al. | |
| 7,480,834 B2 * | 1/2009 | Blaisdell et al. | 714/47 |
| 2002/0087913 A1 | 7/2002 | Harper et al. | |
| 2002/0091972 A1 | 7/2002 | Harris et al. | |
| 2003/0065986 A1 | 4/2003 | Fraenkel et al. | |
| 2003/0204788 A1 | 10/2003 | Smith | |
| 2004/0003042 A1 | 1/2004 | Horvitz et al. | |
| 2004/0168108 A1 | 8/2004 | Chan et al. | |
| 2005/0007249 A1 | 1/2005 | Eryurek et al. | |
| 2005/0155019 A1 | 7/2005 | Levine et al. | |

OTHER PUBLICATIONS

Fishman, D., "Application Availability: An Approach to Measurement", SunUP High Availability Program, Office of the CTO, Sun Microsystems, Inc., 2000, pp. 1-19.

* cited by examiner

*Primary Examiner*—Bryce P Bonzo
(74) *Attorney, Agent, or Firm*—Yee & Associates PC

(57) ABSTRACT

A system and method for monitoring the availability of an application in a distributed data processing environment are provided. The performance aspects of application availability are defined in terms of easily observed and computed characteristics of the application as it behaves in a deployed environment with the deployed configuration. The system and method observe the application processes, the structural resources they require, and the consumable resources they require from the running system itself. These observations are then used to derive minimum requirements for the resource requirement aspects of availability as well as derive criteria for normal behavioral conditions. These minimum requirements and normal behavioral conditions are then used to establish monitoring rules or conditions for monitoring the operation of the application to determine if availability of the application is degrading such that a notification needs to be sent to an administrator.

10 Claims, 5 Drawing Sheets

SYSTEM AND METHOD FOR MONITORING APPLICATION AVAILABILITY

This application is a continuation of application Ser. No. 11/030,249 filed Jan. 6, 2005, status allowed.

BACKGROUND OF THE INVENTION

1. Technical Field

The present invention is generally directed to an improved data processing system. More specifically, the present invention is directed to a system and method for monitoring the availability of applications in a data processing system.

2. Description of Related Art

Application availability, i.e. continuous access to an application with predictable performance, is an aspect of applications provided over data processing networks that is sought to be increased. That is, users of network provided applications wish to have continuous application access while application providers wish to provide uninterrupted access to these applications. However, most network based applications are complex, dynamic and depend on availability of both computer system and network resources to perform their operations. Thus, it is very difficult to achieve complete 100% application availability.

Therefore, it is necessary to have an application availability monitoring system that can monitor application performance characteristics, e.g., response time, to determine if an application is about to become unavailable and the cause of this unavailability. Fishman, "Application Availability: An Approach to Measurement," Sun Microsystems, Inc., 2000, which is hereby incorporated by reference, sets forth one possible approach to decomposing applications for measurement, classifying service level indicators, and presenting measurement as a mode of service level contracting and feedback.

The usual solution to providing an application availability monitoring system requires that the developer of the application availability monitoring system have a detailed understanding and knowledge of the application's structure. Moreover, configuring and tuning an application availability monitoring system to alert an operator when the application becomes unavailable or is about to become unavailable is a labor intensive task that requires constant maintenance.

Therefore, it would be beneficial to have a system and method for monitoring application availability that requires minimal application-specific knowledge, little configuration, and self-adapts to eliminate the on-going maintenance requirement.

BRIEF SUMMARY OF THE INVENTION

The present invention provides a system and method for monitoring the availability of an application in a distributed data processing environment. With the present invention, the performance aspects of application availability are defined in terms of easily observed and computed characteristics of the application as it behaves in a deployed environment with the deployed configuration. The present invention observes the application processes, the structural resources they require, and the consumable resources they require from the running system itself. These observations are then used to derive minimum requirements for the resource requirement aspects of availability as well as derive criteria for normal behavioral conditions. These minimum requirements and normal behavioral conditions are then used to establish monitoring rules or conditions for monitoring the operation of the application to determine if availability of the application is degrading such that a notification needs to be sent to an administrator.

The present invention views availability of an application as being a combination of three main performance condition components: structural conditions, resource/capacity conditions, and behavioral conditions. An application is available if it accepts and completes service requests successfully in a timely fashion. Achieving application availability requires that that the three conditions set forth above be met to a sufficient degree.

In deployment of the application, if any of the structural conditions are violated, then there is often an immediate and urgent availability problem that requires attention. Notifications generated as a result of a critical structural condition violation have a high severity and priority.

Violation of capacity conditions need not necessarily signify that an availability problem exists, but can indicate that the system is moving towards a state where availability may be degraded or that some level of partial degradation may already be present. Severity and priority of notifications generated as a result of a capacity condition violation vary depending upon the criticality of the violation. Notifications are generally targeted to administrators of the system rather than administrators of the software element being monitored.

Violation of behavioral conditions are indications that the software element being monitored is operating in an atypical fashion. This may indicate that an immediate problem exists or that something has changed significantly in the inputs to the software element. Severity and priority of notifications generated as a result of a behavioral condition violation may depend upon the particulars of the condition itself. Notifications may be targeted to administrators of the software element being monitored.

Using this three component combination, and the minimum resource requirement and normal behavioral observations, a monitoring system is established that looks at current structural conditions of the application, current resource metric values of the application, and a set of resource metric values for a predetermined period of time, to determine whether the application's availability is degrading or has become essentially unavailable. The monitoring system may continuously, periodically, or upon the occurrence of an event, obtain current system condition information and compare it to the structural and resource/capacity conditions, and obtain a history of resource metric values, analyze them and compare the results of this analysis to behavioral conditions that define minimum and normal operation of the application to determine if the application is available, availability has been degraded, or the application is unavailable.

These and other features and advantages of the present invention will be described in, or will become apparent to those of ordinary skill in the art in view of, the following detailed description of the preferred embodiments.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
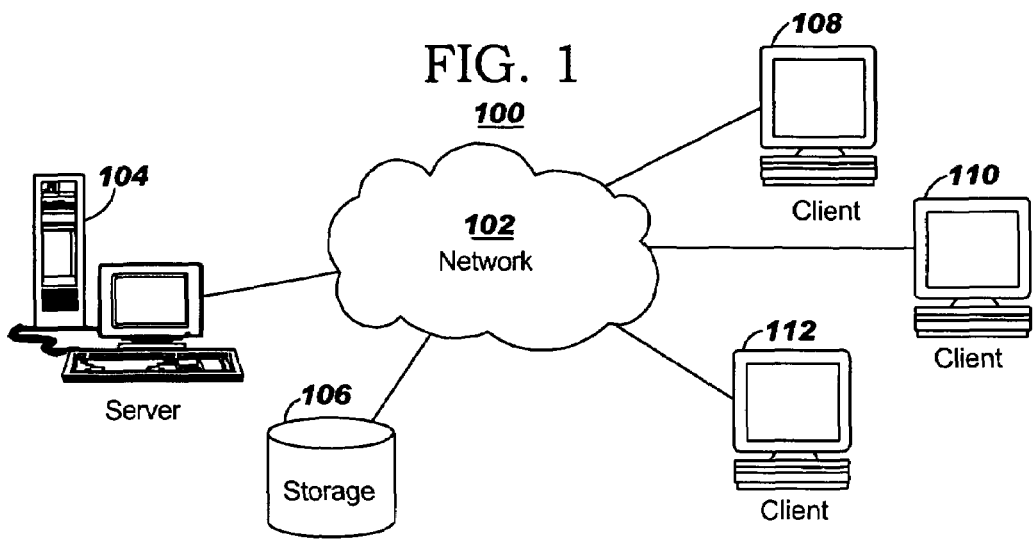
FIG. 1 is an exemplary block diagram of a distributed data processing environment in which aspects of the present invention may be implemented.
Figure 2:
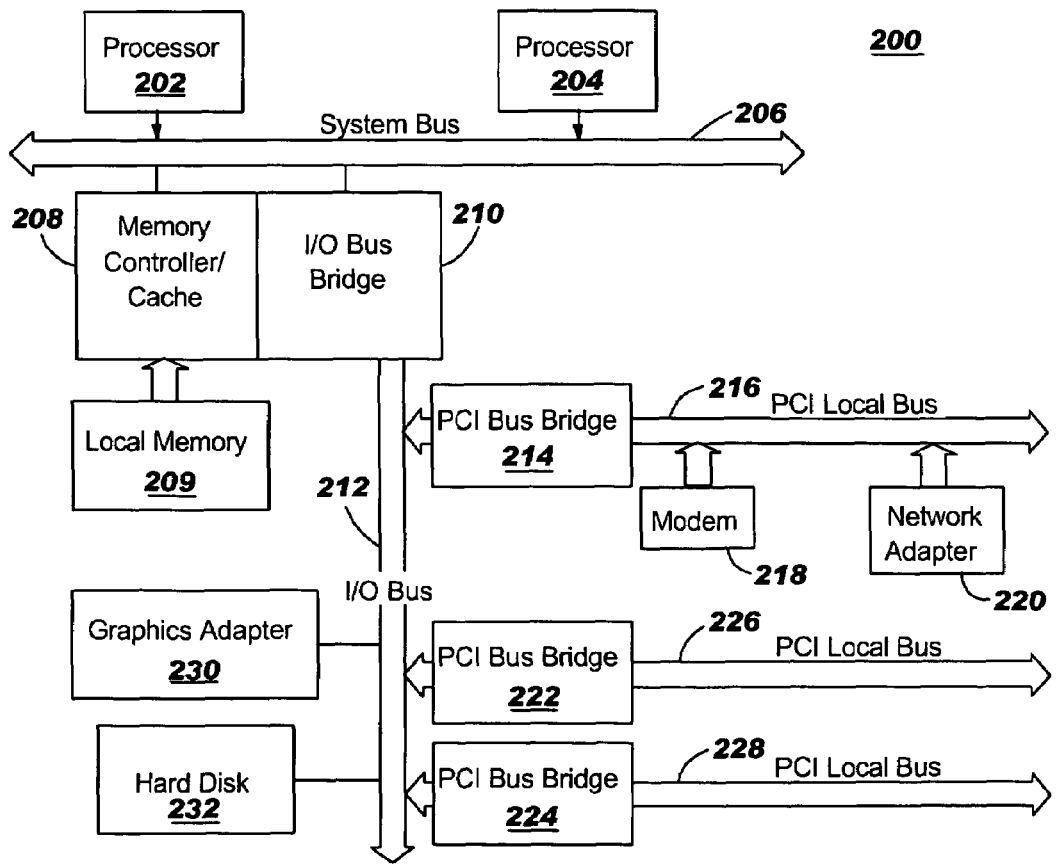
FIG. 2 is an exemplary block diagram of a server computing device in which aspects of the present invention may be implemented.
Figure 3:
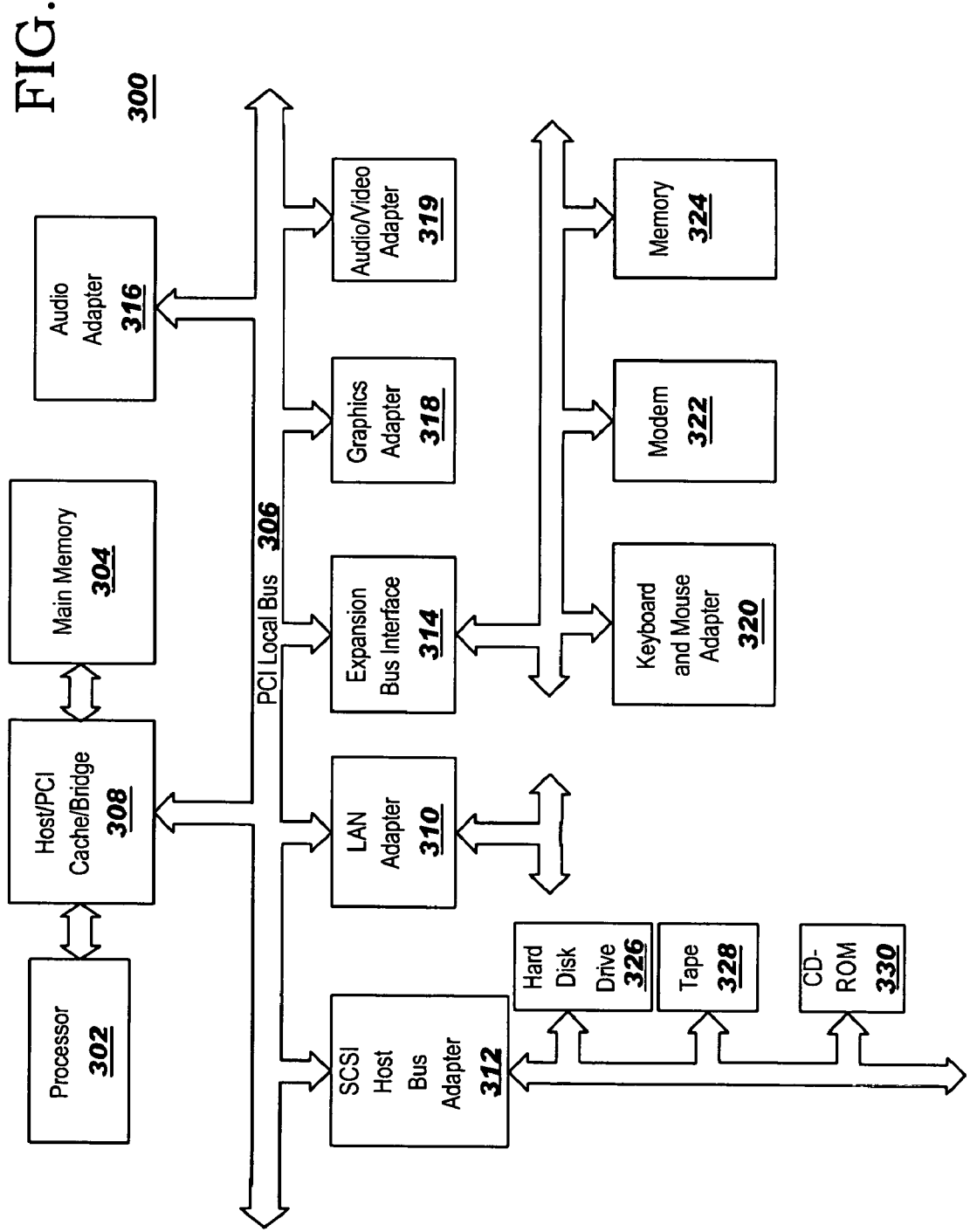
FIG. 3 is an exemplary block diagram of a client computing device in which aspects of the present invention may be implemented.

The present invention provides a mechanism for monitoring availability of applications in a distributed data processing environment. Therefore, FIGS. 1-3 are provided herein as examples of the distributed data processing environment and computing devices in which aspects of the present invention may be implemented. It should be noted that FIGS. 1-3 are only exemplary and are not intended to state or imply any limitation as to the configuration of the distributed data processing environments and computing devices in which the exemplary aspects of the present invention may be implemented. Many modifications to the configurations shown in FIGS. 1-3 may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a system and method for monitoring the availability of an application in a distributed data processing environment. With the present invention, the performance aspects of application availability are defined in terms of easily observed and computed characteristics of the application as it behaves in a deployed environment with the deployed configuration. The present invention observes the application processes, the structural resources they require, and the consumable resources they require from the running system itself. These observations are then used to derive minimum requirements for the resource requirement aspects of availability as well as derive criteria for normal behavioral conditions. These minimum requirements and normal behavioral conditions are then used to establish monitoring rules or conditions for monitoring the operation of the application to determine if availability of the application is degrading such that a notification needs to be sent to an administrator.

The present invention views availability of an application as being a combination of three main performance condition components: structural conditions (e.g., the application's processes must be running, the ports upon which requests arrive must be open, the file systems must be mounted, etc.), resource/capacity conditions (e.g., the computing systems upon which the application executes must have sufficient CPU, memory, and other resource capacity to service the requests), and behavioral conditions (the processes must be consuming resources at a rate appropriate to the workload and must not be emitting errors). An application is available if it accepts and completes service requests successfully in a timely fashion. Achieving application availability requires that that the three conditions set forth above be met to a sufficient degree.

In deployment of the application, if any of the structural conditions are violated, then there is often an immediate and urgent availability problem that requires attention. Notifications generated as a result of a critical structural condition violation have a high severity and priority.

Violation of capacity conditions need not necessarily signify that an availability problem exists, but can indicate that the system is moving towards a state where availability may be degraded or that some level of partial degradation may already be present. Severity and priority of notifications generated as a result of a capacity condition violation vary depending upon the criticality of the violation. Notifications are generally targeted to administrators of the system rather than administrators of the software element being monitored.

Violation of one or more behavioral conditions is an indication that the software element being monitored is operating in an atypical fashion. This may indicate that an immediate problem exists or that something has changed significantly in the inputs to the software element. Severity and priority of notifications generated as a result of a behavioral condition violation may depend upon the particulars of the condition itself. Notifications may be targeted to administrators of the software element being monitored.

Using this three component combination, and the minimum resource requirement and normal behavioral observations, a monitoring system is established that looks at current structural conditions of the application, current resource metric values of the application, and a set of resource metric values for a predetermined period of time, to determine whether the application's availability is degrading or has become essentially unavailable. The monitoring system may continuously, periodically, or upon the occurrence of an event, obtain current system condition information and compare it to the structural and resource/capacity conditions, and obtain a history of resource metric values, analyze them and compare the results of this analysis to behavioral conditions that define minimum and normal operation of the application to determine if the application is available, availability has been degraded, or the application is unavailable.

From the above, it can be seen that if any of the structural conditions are violated by current conditions, the application is determined to be unavailable. Thus, for example, if the application is not present, the proper ports do not have listeners opened on them, the listener on the port is not the listener for the application, the file system is not mounted, or the like, then the application can not run appropriately and is determined to be unavailable. Based on such a determination, an appropriate notification may be sent to a system administrator indicating the source of the problem, i.e. which structural condition was not met.

With the present invention, capacity conditions are set and maintained by observing the specific usage of the application over time. The application may be determined to be in a degraded availability state, thereby requiring a notification to be sent to an administrator, if the current capacity conditions dropped below a predetermined percentile of the normally available capacity. Similarly, the application may be determined to be effectively unavailable if the current capacity conditions dropped below a second percentile of the normally available capacity. The percentile levels that are used may be specified by the user or automatically determined dynamically by the system based on current conditions, such as loading conditions, traffic conditions, or the like.

That is, from the observations and measured metrics of the operation of the application as it is deployed in the data processing environment, a range of values for each resource are obtained that are assumed to represent the normal operation of the application. In addition, a minimum amount of each resource is identified as the minimum of the observed and measured metrics for the resource. The range of values for the measured metric from the minimum amount to the highest observed metric may be partitioned into percentile levels. These percentile levels may be used along with user specified percentiles, or automatically determined percentiles, to determine when resource/capacity conditions are such that the application is available, unavailable, or in a state of degraded availability.

That is, the user may set up a generic rule set that states that the availability of an application is determined to be in a "degraded availability" state if the capacity conditions, i.e. available resources, drops below a $20^{th}$ percentile of the normal resource availability observed. That is, if the current conditions indicate that one or more of the resources has an amount of available resources that is below the $20^{th}$ percentile of the range of normal available resources generated from the observations and metrics, then the application is determined to have a degraded availability and a notification to this effect may be sent to a system administrator. Similarly, the user may establish that if the amount of available resources drops below the $5^{th}$ percentile of the range of normal available resources, the application is determined to be "effectively unavailable" and an appropriate notification may be sent to a system administrator.

Thus, the user may establish a set of generic conditions that identify percentiles corresponding to various states of application availability. These generic conditions may then be applied to specific ranges of normal resource availability metrics, generated from observation and measurement of resource metrics during operation of the application in the deployed environment, to determine a state of availability of the application. Thus, the present invention permits a user to establish a set of conditions for determining application availability without having to have a detailed understanding of the operation of the application.

For example, taking available storage space as an observed and measured metric for a memory resource, a minimum amount of available storage space may be observed and measured to be 10 MB with a range up to approximately 110 MB. Assume a user sets the generic conditions to be "degraded availability" when the available capacity of resources drops below a $20^{th}$ percentile and "effectively unavailable" when the available capacity of resources drops below the $5^{th}$ percentile. This means that if the available storage space falls below 30 MB but is above 15 MB, then the availability of the application is determined to be a "degraded availability." If the available storage space falls below 15 MB, then the application is determined to be "effectively unavailable." Appropriate notifications for each of these cases may be sent to a system administrator so that corrective action may be taken, e.g., root cause analysis and reconfiguration.

The behavioral conditions defining application availability are used to describe the relationships between resource consumption drivers and resources. The behavioral conditions may be defined in terms of index metrics and dependent metrics. That is the behavioral conditions may be defined in terms of functions defining dependent metrics as a function of index metrics such that the relationship between the index metrics and the dependent metrics is defined. The normal range of metric values for each resource metric may be applied to these relationships to provide a set of behavioral conditions for defining normal operation of an application. Thus, in this way, thresholds for each metric defining normal operation of an application may be conditioned on the value of another metric.

Figure 4:
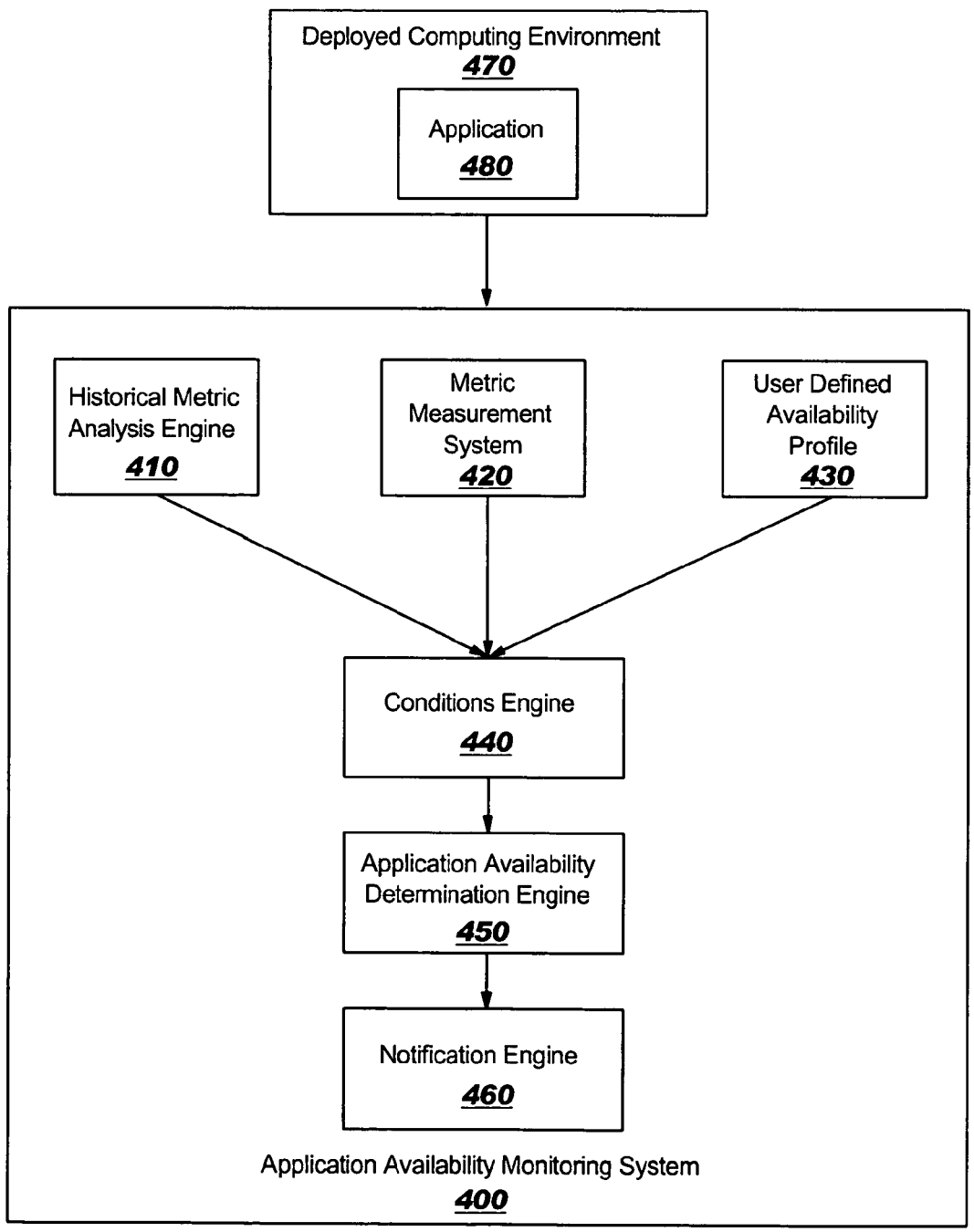
FIG. 4 is an exemplary block diagram of an application availability monitoring system in accordance with one exemplary embodiment of the present invention.

FIG. 4 is an exemplary block diagram of an application availability monitoring system in accordance with one exemplary embodiment of the present invention. As shown in FIG. 4, the application availability monitoring system 400 includes a historical metric analysis engine 410, a metric measurement system 420, a user defined availability profile 430, an availability conditions engine 440, an application availability determination engine 450, and a notification engine 460. The application availability monitoring system 400 monitors the availability of an application 480 in a deployed environment 470 during its operation handling requests from client devices, for example.

The application availability monitoring system 400 may be implemented in a server computing device, such as server device 200, in a dedicated computing device, or the like. The application availability monitoring system 400 may be implemented in the same server computing device as the application 480, i.e. in deployed environment 470, or may be part of a separate computing device that is in communication with the deployed environment 470 of the application 480.

The metric measurement system 420 of the application availability monitoring system 400 measures performance and resource metrics of the deployed environment 470 during operation of the application 480. In this way, the impact of the running of the application 480 on the deployed environment 470 may be determined with regard to the resources utilized by the application 480. This information is stored for use by the historical metric analysis engine 410 which processes this information to determine minimum metric values for proper operation of the application 480 as well as a range of normal metric values for the application. The minimum metric values and range of normal metric values for the application are provided to conditions engine 440 for use in generating conditions defining the various states of availability of the application 480.

The metrics referred to herein may be any metric associated with a resource that is measurable. Such metrics may include, for example, processor usage, memory usage, bandwidth usage, amount of data transferred, number of error messages generated, number of input/output (I/O) interrupts generated per second, amount of physical storage space consumed, and the like.

In addition to the minimum and normal range of metric values provided by the historical metric analysis engine 410, the user defined availability profile 430 provides generic availability percentiles to be applied to the minimum and normal range of metric values by the conditions engine 440. As mentioned above, these generic availability percentiles may be provided by the user or may be dynamically determined automatically by the application availability monitoring system. For example, if the number of instances where the application 480 is determined by the application availability monitoring system 400 to be in a degraded availability state or an unavailable state is above a predetermined threshold, and the application 480 continues to operate satisfactorily, then the availability percentiles may be adjusted automatically to reflect the actual operation of the application 480.

The conditions engine 440 generates structural, resource/capacity and behavioral conditions based on the minimum and normal range of metric values obtained from the historical metric analysis engine 410, the availability percentiles supplied by the user defined availability profile 430, and structural information obtained from the application 480. The structural information may include, for example, the name of the application process, the ports used by the application, the name of the listener methods that listen to the ports used by the application, the file system that is to be mounted for proper operation of the application, and other structural aspects of the application 480.

Based on the structural information, the conditions engine 440 generates conditions for defining the application 480 as being available. Such conditions may include, for example, determining whether the proper process exists, determining whether the proper ports have listeners open on them, whether the listeners on the ports are the proper ones for this application 480, whether the file system has been mounted, and the like. If any of these conditions are not met by the current situation of the application, then the application is not available, i.e. is in an unavailable state.

Based on the minimum and normal range of metric values, various resource/capacity conditions are generated by the conditions engine 440 for the resources used by the application 480. These resource/capacity conditions establish the minimum and/or maximum values for the various metrics. Examples of such resource/capacity conditions include that there must by at least X % idle CPU, the file system has at least Y MB of free space, the system has at least Z MB of physical memory available, and the system services fewer than P I/O-related interrupts per second.

In addition, the availability percentiles provided by the user defined availability profile 430 may be used to generate thresholds defining various availability states of the application based on the minimum and normal range of metric values. Thus, the resource/capacity conditions may include conditions based on the application of the availability percentiles to the minimum and normal range of metric values provided by the historical metric analysis engine 410.

As discussed above, such availability percentiles may be generically stated such that, for example, if any resource availability falls below a $20^{th}$ percentile, the application is considered to be in a "degraded availability" state and if the resource availability falls below a $5^{th}$ percentile, then the application is considered to be in an "unavailable" state. Thus, using this example, if the normal range of metric values is from 10 to 110, if current conditions indicate that the value of this metric is between 15 and 30, then the state is considered to be "degraded availability." If the current value of the metric is below 15, then the state of the application is considered to be "unavailable." Appropriate notifications may be sent when such conditions are met.

The conditions engine 440 generates behavioral conditions based on the minimum and normal ranges of metric values, the availability percentiles provided by the user defined availability profile 430, and other predefined behavioral conditions. For example, default behavioral conditions may include, for example, that the file system is not logging error messages that were emitted by the application 480. Other behavioral conditions generated based on the minimum and normal ranges or metric values include, for example, that in 90% of the historical observations, the system consumes between X % and Y % of the CPU and that for 90% of the historical observations, the system generates between X and Y amount of output data.

Thus, the behavioral conditions represent a statistical analysis of the resource metric information provided by the metric measurement system 420. This statistical analysis may be performed, for example, in the historical metric analysis engine 410. Based on this statistical analysis, percentiles of observed metric values may be established for defining behavior of the application 480.

The behavioral conditions are used to describe the relationships between resource consumption drivers and resources, i.e. the cost of doing a particular amount of work with a proxy index into the amount of work.

Figure 5:
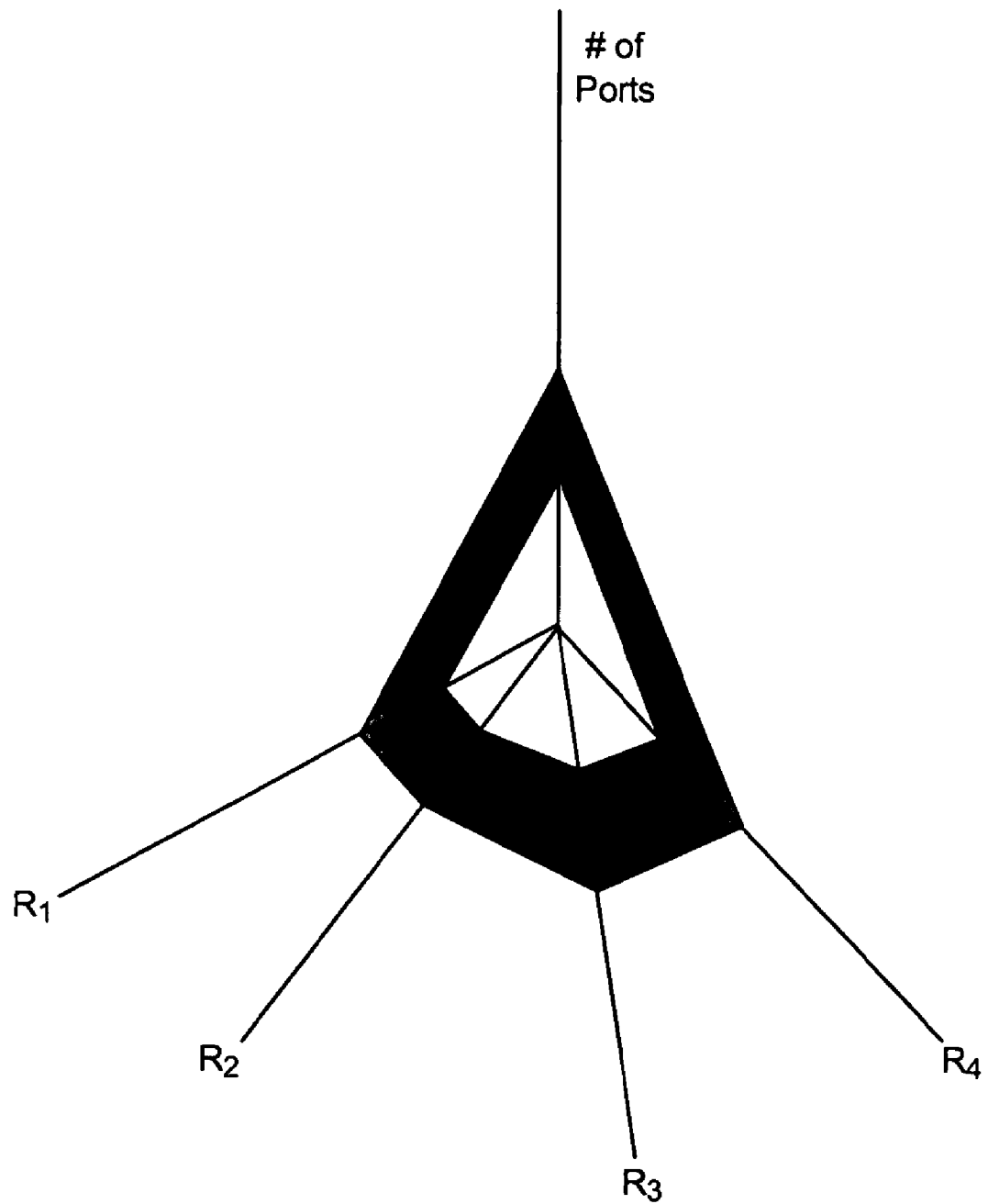
FIG. 5 is an exemplary diagram illustrating a plot of the relationship between a plurality of metrics to thereby define behavioral conditions of an application.

FIG. 5 is an exemplary diagram illustrating a plot of the relationship between a plurality of metrics to thereby define behavioral conditions of an application. As shown in FIG. 5, the vertical axis represents the current number of ports used by the application and the four other axes represent other resources $R_1$-$R_4$. The shaded area characterizes the "normal volume" within which "normal" resource consumption lies. The vertices of the normal value may easily be determined by a percentile approach similar to that described above with regard to the resource/capacity conditions. The main difference being that both the low and high end conditions are considered when determining behavioral condition violations rather than only the low end as with the resource/capacity conditions. Thus, for example, warning notifications may be generated if resource availability falls below a particular percentile or exceeds a second percentile of the range of metric values for that resource in the "normal volume" for that particular number of ports.

Thus, from a user's standpoint, the user need only set forth the generic percentiles that he/she wishes to use to generate notifications. The user need not have an intimate knowledge of the application, the resources it uses, the amount of resources it typically uses, or the like. Rather, the user merely sets forth criteria indicating what the user believes would be a situation requiring notification that applies to all resources utilized by the application, i.e. criteria that applies to the application as a whole.

These generic percentiles and/or criteria may then be applied against specific measured metric values for the various resources used by the application. Thus, the system of the present invention automatically monitors the application to determine what minimum values and normal ranges of values for the metrics are and applies the user's generic percentiles and/or criteria to these values and ranges of values to define conditions representing availability of the application. Since the mechanisms of the present invention operate automatically, the only configuration necessary is that the user provide an availability profile defining those generic percentiles and criteria that the user wished to be used to generate notifications. However, even this amount of configuration may not be necessary if a fully automated embodiment is utilized wherein the generic percentiles and criteria are determined by an intelligent mechanism, e.g., expert system, neural network, etc., based on the observed and measured metric values.

Furthermore, since the measurements of the metrics for the various resources utilized by the application is performed on a deployed environment in which the application is running and handling requests from client devices, more accurate data reflecting the actual minimum and normal range of values for metrics associated with resources is obtained. Furthermore, the conditions generated based on these measurements of metric values may be continuously, periodically, or in response to a particular event, e.g., system administrator command, updated in a self-adapting manner. Thus, the resource/capacity conditions and behavioral conditions may be updated as new metric measurements are collected by the metric measurement system and analyzed by the historical metric analysis engine. In this way, the system dynamically adapts itself to the changes in the deployed environment thereby reducing the amount of ongoing maintenance required of system administrators.

Figure 6:
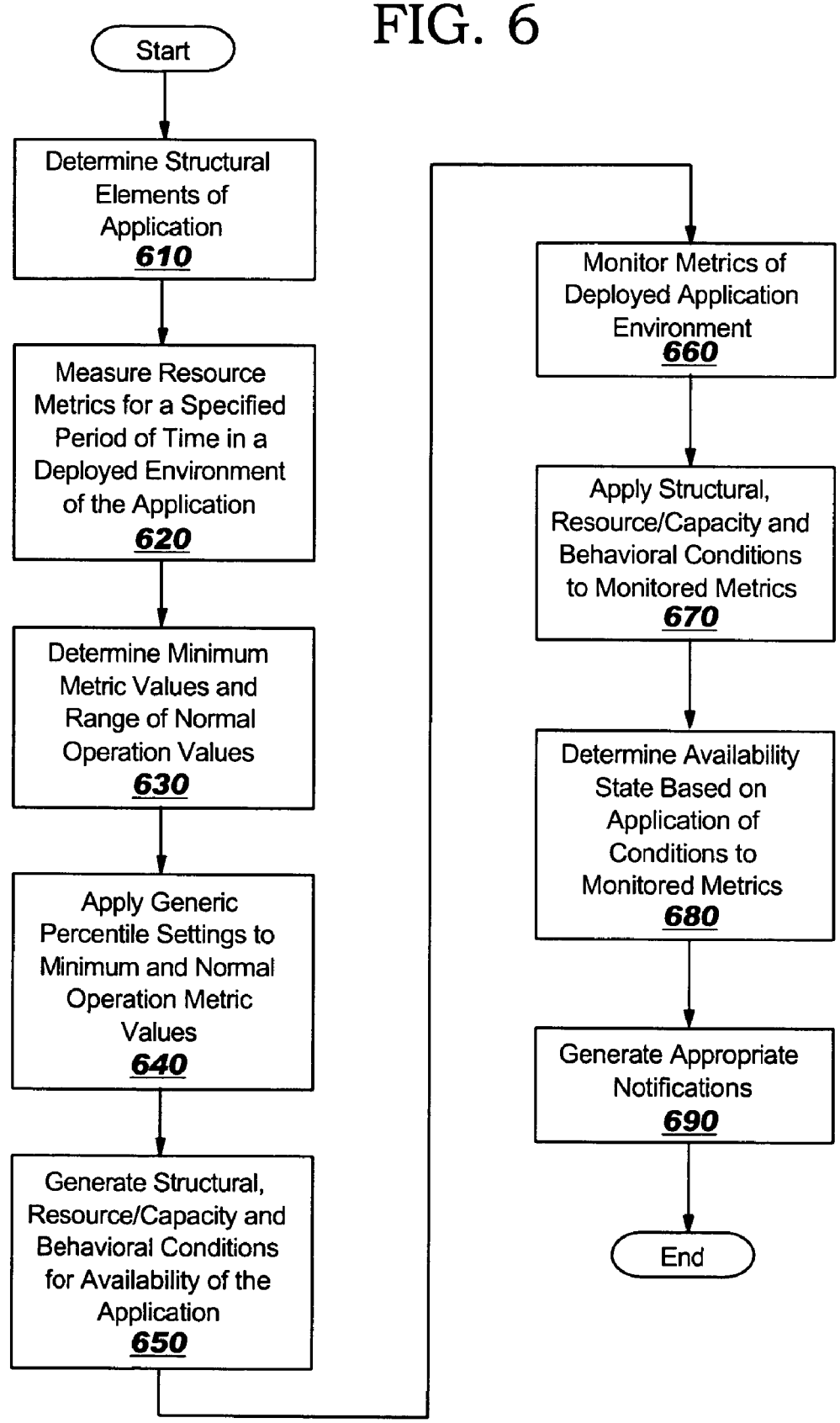
FIG. 6 is a flowchart outlining an exemplary operation of one exemplary embodiment of the present invention.

FIG. 6 is a flowchart outlining an exemplary operation of one exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts by determining the structural elements of the application being monitored (step 610). The resource metrics of interest are then measured for a specified period of time in a deployed environment of the application (step 620). The measured metrics are then analyzed to determine the minimum metric values and the range of normal operational values for these metrics (step 630). Generic percentile settings are then applied to the minimum and normal operation metric values (step 640). Thereafter, structure, resource/capacity, and behavioral conditions are generated based on the structural information, the minimum metric values, the range of normal operation metric values, and the generic percentile settings (step 650). As a result, an application availability monitor is generated having conditions defining various states of availability of the application being monitored.

Thereafter, the metrics of the resources associated with the deployed application environment are monitored (step 660). The structural, resource/capacity and behavioral conditions are applied to the monitored metrics (step 670) and a determination is made as to the availability state of the application based on the results of applying the conditions to the monitored metrics (step 680). Appropriate notifications are then generated and sent when the availability state of the application changes (step 690). The operation then ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a recordable-type medium for monitoring availability of an application, comprising:
   instructions for measuring, in a deployed environment in which the application is running, one or more metrics associated with one or more resources utilized by the application, to thereby generate measured values for the one or more metrics;
   instructions for analyzing the measured values to generate a range of normal operational metric values;
   instructions for applying one or more generic percentiles, that may be applied to measurements of any of a number of different metrics and which define availability states of the application, to the range of normal operational metric values to thereby generate one or more availability conditions, wherein the generic percentiles are derived at least from a partitioning of the range of the normal operational metric values, and wherein the one or more availability conditions comprise structure conditions, capacity conditions, and behavioral conditions, and wherein the structural conditions include at least one of the application being present, the proper ports used by the application having listeners opened on them, a listener on the proper ports corresponds to the application, and file system for the application is mounted; and
   instructions for applying the one or more availability conditions to collected resource metrics associated with resources utilized by the application to thereby determine the availability of the application.

2. The computer program product of claim 1, further comprising:
   instructions for identifying the structural conditions for the application, wherein the structural conditions identify structural resources that are required to be available;
   instructions for determining if any of the structural conditions are violated; and
   instructions for generating a notification that the application is unavailable if any of the structural conditions are violated.

3. The computer program product of claim 2, wherein the structural conditions include at least one of the application being present, the proper ports used by the application having listeners opened on them, a listener on the proper ports corresponds to the application, and a file system for the application is mounted.

4. The computer program product of claim 1, wherein the instructions for applying one or more generic percentiles, defining availability states of the application, to the range of normal operational metric values to thereby generate one or more availability conditions include:
   instructions for applying a first generic percentile to the range of normal operational metric values to identify a first availability condition in which a metric value falling below the first general percentile of the range of normal operational metric values is considered to have a degraded availability state; and
   instructions for applying a second generic percentile to the range of normal operational metric values to identify a second availability condition in which a metric value falling below the second general percentile of the range of normal operational metric values is considered to have an unavailable state.

5. The computer program product of claim 1, wherein the generic percentiles are dynamically determined based on current conditions.

6. The computer program product of claim 1, wherein the instructions for applying one or more generic percentiles, defining availability states of the application, to the range of normal operational metric values to thereby generate one or more availability conditions include:
  instructions for partitioning the range of normal operational metric values into normal operation percentiles; and
  instructions for associating availability states with one or more of the normal operation percentiles based on the one or more generic percentiles.

7. The computer program product of claim 1, further comprising:
  instructions for generating one or more notifications based on results of applying the one or more availability conditions to collected resource metrics associated with resources utilized by the application.

8. The computer program product of claim 1, wherein the one or more metrics include one or more of processor usage, memory usage, bandwidth usage, amount of data transferred, number of error messages generated, number of input/output interrupts generated per second, and amount of physical storage space consumed.

9. The computer program product of claim 1, further comprising:
  instructions for generating the behavioral conditions based on a combination of normal ranges of metric values for a plurality of metrics and the generic percentiles, wherein the behavioral conditions describe relationships between metrics associated with resource consumption drivers and metrics associated with resources.

10. A system for monitoring availability of an application, comprising:
  means for measuring, in a deployed environment in which the application is running, one or more metrics associated with one or more resources utilized by the application, to thereby generate measured values for the one or more metrics;
  means for analyzing the measured values to generate a range of normal operational metric values;
  means for applying one or more generic percentiles, that may be applied to measurements of any of a number of different metrics and which define availability states of the application, to the range of normal operational metric values to thereby generate one or more availability conditions, wherein the generic percentiles are derived at least from a partitioning of the range of the normal operational metric values, and wherein the one or more availability conditions comprise structure conditions, capacity conditions, and behavioral conditions, and wherein the structural conditions include at least one of the application being present, the proper ports used by the application having listeners opened on them, a listener on the proper ports corresponds to the application, and file system for the application is mounted; and
  means for applying the one or more availability conditions to collected resource metrics associated with resources utilized by the application to thereby determine the availability of the application.

* * * * *